US012573602B2

(12) United States Patent
Schneider et al.

(10) Patent No.: US 12,573,602 B2
(45) Date of Patent: Mar. 10, 2026

(54) AUTOMATED METHOD PARAMETER CONFIGURATION FOR DIFFERENTIAL MOBILITY SPECTROMETRY SEPARATIONS

(71) Applicant: DH Technologies Development Pte. Ltd., Singapore (SG)

(72) Inventors: Bradley B. Schneider, Bradford (CA); Leigh Bedford, Ajax (CA)

(73) Assignee: DH Technologies Development Pte. Ltd., Singapore (SG)

( * ) Notice: Subject to any disclaimer, the term of this patent is extended or adjusted under 35 U.S.C. 154(b) by 310 days.

(21) Appl. No.: 18/554,840

(22) PCT Filed: Apr. 14, 2022

(86) PCT No.: PCT/IB2022/053540
§ 371 (c)(1),
(2) Date: Oct. 11, 2023

(87) PCT Pub. No.: WO2022/219585
PCT Pub. Date: Oct. 20, 2022

(65) Prior Publication Data
US 2024/0186130 A1 Jun. 6, 2024

Related U.S. Application Data

(60) Provisional application No. 63/175,756, filed on Apr. 16, 2021.

(51) Int. Cl.
*H01J 49/04* (2006.01)

(52) U.S. Cl.
CPC ................................ *H01J 49/0454* (2013.01)

(58) Field of Classification Search
USPC .................................................. 250/282, 281
See application file for complete search history.

(56) References Cited

U.S. PATENT DOCUMENTS

2016/0365236 A1* 12/2016 Green ................. H01J 49/0036

FOREIGN PATENT DOCUMENTS

WO 2022136911 A1 6/2022

OTHER PUBLICATIONS

International Search Report and Written Opinion for PCT Patent Application No. PCT/IB2022/053540 mailed Jul. 20, 2022.

(Continued)

*Primary Examiner* — Kiet T Nguyen
(74) *Attorney, Agent, or Firm* — Lathrop GPM LLP; Malaika O.D. Tyson; Jason Kuchar

(57) ABSTRACT

Systems and methods are disclosed for automated method parameter configuration for differential mobility separations. As non-limiting examples, various aspects of this disclosure provide receiving a sample in an open port interface; transferring the sample to an ionization source; ionizing the transferred sample; introducing the ionized sample into a mass spectrometer; mass analyzing the ionized sample to produce an initial mass analysis result; determining a peak width of the initial mass analysis result; and determining a dwell time for subsequent measurements based on the determined peak width, a pre-defined number of data points across subsequent mass analysis peak widths, and a number of different analytes to be assessed for the sample. The sample may be diluted and transferred to the ionization source by a sample introduction apparatus selected from a group including an acoustic droplet ejector (ADE), a pneumatic ejector, a piezoelectric ejector, and a hydraulic ejector.

22 Claims, 14 Drawing Sheets

(56) References Cited

OTHER PUBLICATIONS

Tim Habe et al., "Ultrahigh-Throughput ESI-MS: Sampling Pushed to Six Samples Per Second by Acoustic Ejection Mass Spectrometry", Analytical Chemistry, vol. 92, No. 18, Aug. 3, 2020, pp. 12242-12249, XP055827497.

PCT, International Preliminary Report on Patentability regarding Application No. PCT/IB2022/053540, dated Oct. 12, 2023, 10 pages.

* cited by examiner

AUTOMATED METHOD PARAMETER CONFIGURATION FOR DIFFERENTIAL MOBILITY SPECTROMETRY SEPARATIONS

REFERENCE

The present application is filed pursuant to 35 U.S.C. 371 as a U.S. National Phase application of International Patent Application No PCT/IB2022/053540, which was filed Apr. 14, 2022, claimING the priority benefit of U.S. Provisional Patent Application Ser. No. 63/175,756, filed Apr. 16, 2021, the content of each is hereby incorporated by reference in its entirety into this disclosure.

BACKGROUND

Conventional approaches for configuring mass spectrometers may be costly, cumbersome, and/or inefficient—e.g., they may be complex and/or difficult to implement.

SUMMARY

Figure 1A:
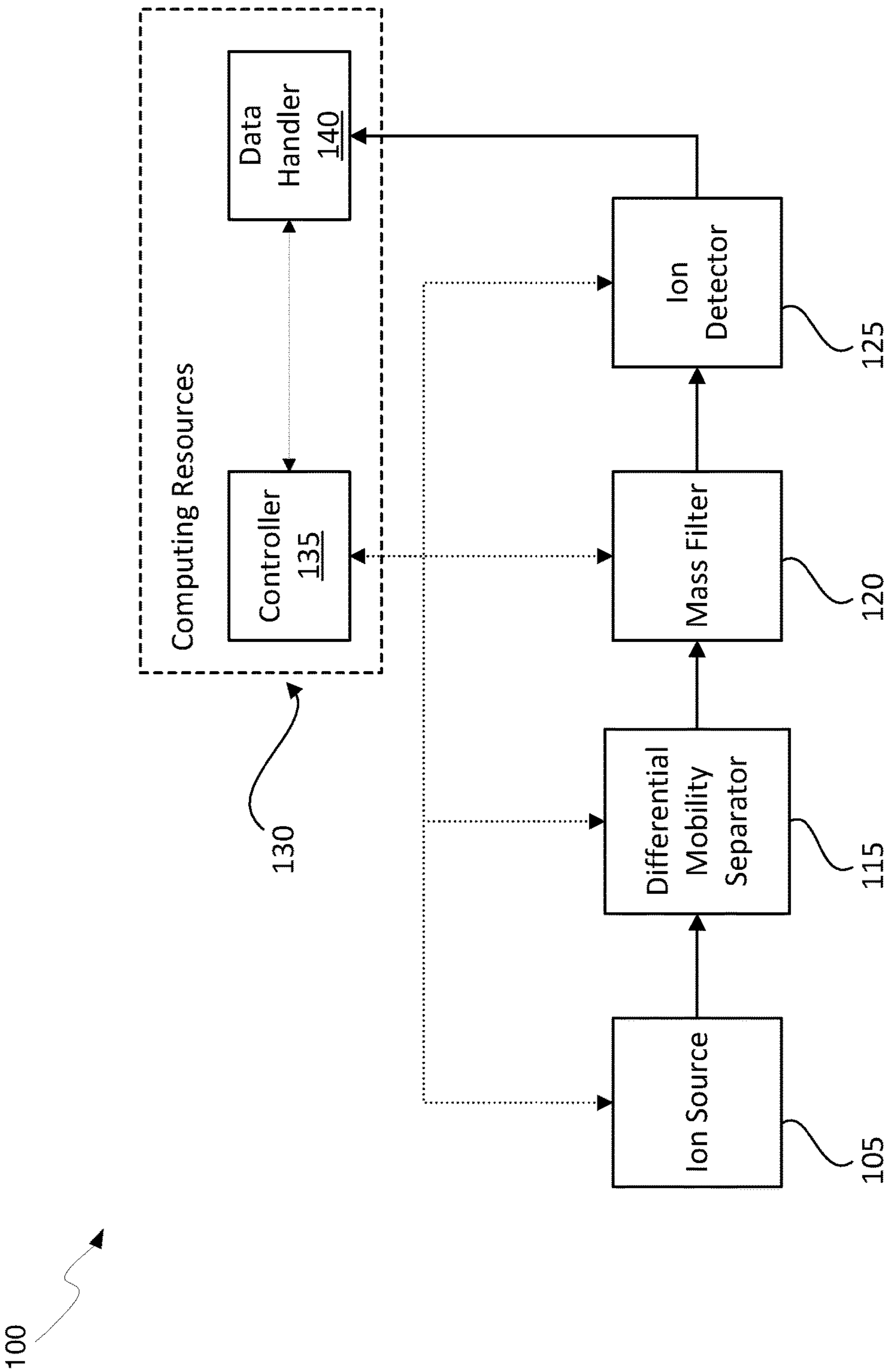
FIG. 1A shows a high level block diagram of a sample processing system according to an embodiment of the disclosure.

A system and/or method for method parameter configuration for differential mobility separations, substantially as shown in and/or described in connection with at least one of the figures, as set forth completely in the claims.

These and other advantages, aspects and novel features of the present disclosure, as well as details of an illustrated embodiment thereof, will be more fully understood from the following description and drawings.

DETAILED DESCRIPTION OF VARIOUS ASPECTS OF THE DISCLOSURE

As utilized herein the terms “circuits” and “circuitry” refer to physical electronic components (i.e., hardware) and any software and/or firmware (“code”) that may configure the hardware, be executed by the hardware, and or otherwise be associated with the hardware. As used herein, for example, a particular processor and memory (e.g., a volatile or non-volatile memory device, a general computer-readable medium, etc.) may comprise a first “circuit” when executing a first one or more lines of code and may comprise a second “circuit” when executing a second one or more lines of code.

As utilized herein, circuitry is “operable” to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, “and/or” means any one or more of the items in the list joined by “and/or”. As an example, “x and/or y” means any element of the three-element set {(x), (y), (x, y)}. That is, “x and/or y” means “one or both of x and y.” As another example, “x, y, and/or z” means any element of the seven-element set {(x), (y), (z), (x, y), (x, z), (y, z), (x, y, z)}. That is, “x, y, and/or z” means “one or more of x, y, and z.” As utilized herein, the terms “e.g.,” and “for example” set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms “comprises,” “includes,” “comprising,” “including,” “has,” “have,” “having,” and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as “upper,” “lower,” “side,” and the like, may be used in distinguishing one element from another element in a relative manner. It should be understood, however, that components may be oriented in different manners, for example a semiconductor device may be turned sideways so that its “top” surface is facing horizontally and its “side” surface is facing vertically, without departing from the teachings of the present disclosure.

The current state of product development, and scientific advancement in general, for example in the life sciences, is hampered by current systems and methods, adding literally years to product and/or scientific development cycles.

FIG. 1A shows a high level block diagram of a sample processing system according to an embodiment of the disclosure. The sample processing system 100 comprises an ion source 105, a differential mobility spectrometer (DMS) 115, a mass filter 120, an ion detector 125, and computing resources 130.

The ion source 105 may comprise an electrospray source, for example, and may serve to transfer processed samples or sample aliquots to the DMS 115. The DMS 115 separates ions based on their mobility and may comprise a planar DMS, FAIMS, curved electrode DMS, etc. In a planar example, the DMS 115 may comprise two flat, parallel plate electrodes where a separation voltage (SV) may be applied between them such that ions may be transported through the DMS 115 by a transport gas flow and drift towards one of the electrodes. AC and DC signals may be applied to cause ions with a specific ion mobility to pass through while others are deflected towards the electrodes.

The DMS 115 may deliver selected ions to the mass filter 120, which may comprise one or more multipole rod sets, for example. The mass filter 120 may filter ions based on m/z, fragment, and/or mass analyze ions. An example of a mass filter 120 is one or more quadrupole rod sets. The mass filter 120 may comprise a plurality of quadrupole rod sets, for example three rod sets, that may be configured to filter specific ions.

The ion detector 125 may comprise a microchannel plate (MCP) detector, an electrostatic trap, a time of flight (TOF) mass spectrometer, optical detector, or other known ion detector used in mass spectrometry. The ion detector 125 may be operable to detect ions passed through by the mass filter 120. In an embodiment, the mass filter 120 comprises at least one multipole rod set and the ion detector 125 comprises an MCP detector, an optical detector, an electrostatic trap or a TOF mass spectrometer.

The computing resources 130 may comprise a controller 135 and data handler 140. The controller 135 may control the ion source 105, the DMS 115, the mass filter 120, and the ion detector 125. The data handler 140 may store data for processing samples, sample data, or data for analyzing sample data, and may receive an output signal from the ion detector 125.

The computing resources 130 may include any suitable data computation and/or storage device or combination of such devices. An example controller may comprise one or more microprocessors working together with storage to accomplish a desired function. The controller 135 and/or data handler may include at least one computing element that comprises at least one high-speed data processor adequate to execute program components for executing user and/or system-generated requests.

In various embodiments, sample processing system 100 may be connected to one or more other computer systems across a network to form a networked system. The network may comprise a private network or a public network such as the Internet. In the networked system, one or more computer systems may store and serve the data to other computer systems. The one or more computer systems that store and serve the data may be referred to as servers or the cloud, in a cloud computing scenario. The one or more computer systems may include one or more web servers, for example. The other computer systems that send and receive data to and from the servers or the cloud may be referred to as client or cloud devices, for example. It will be apparent to those of skill in the relevant arts that various embodiments of the present disclosure may utilize a computer as is known in the art.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Figure 1B:
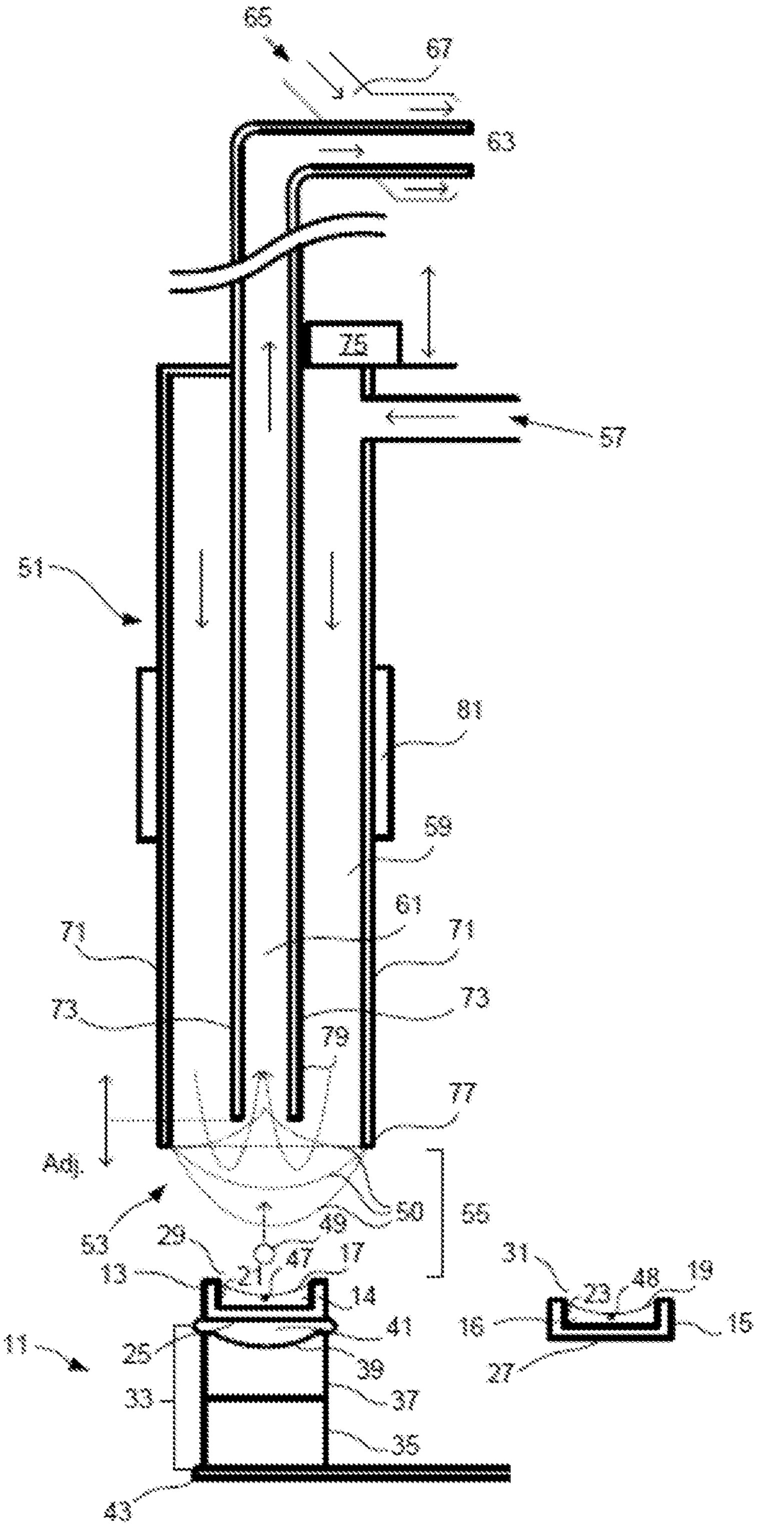
FIG. 1B is a schematic diagram of a sample introduction apparatus, in accordance with an example embodiment of the disclosure.
Figure 1C:
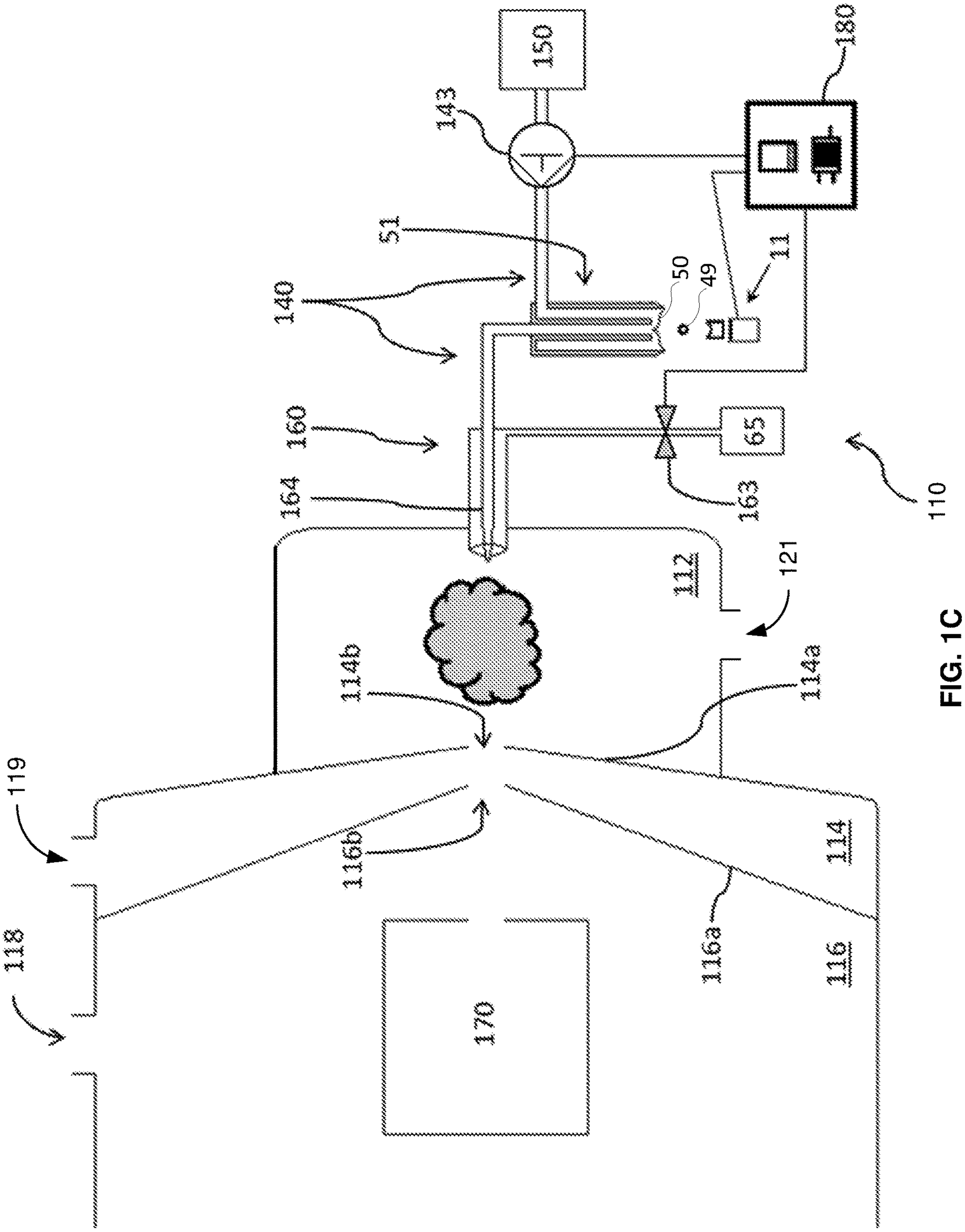
FIG. 1C schematically depicts an embodiment of a droplet injection and ionization system, in accordance with an example embodiment of the disclosure.
Figure 1D:
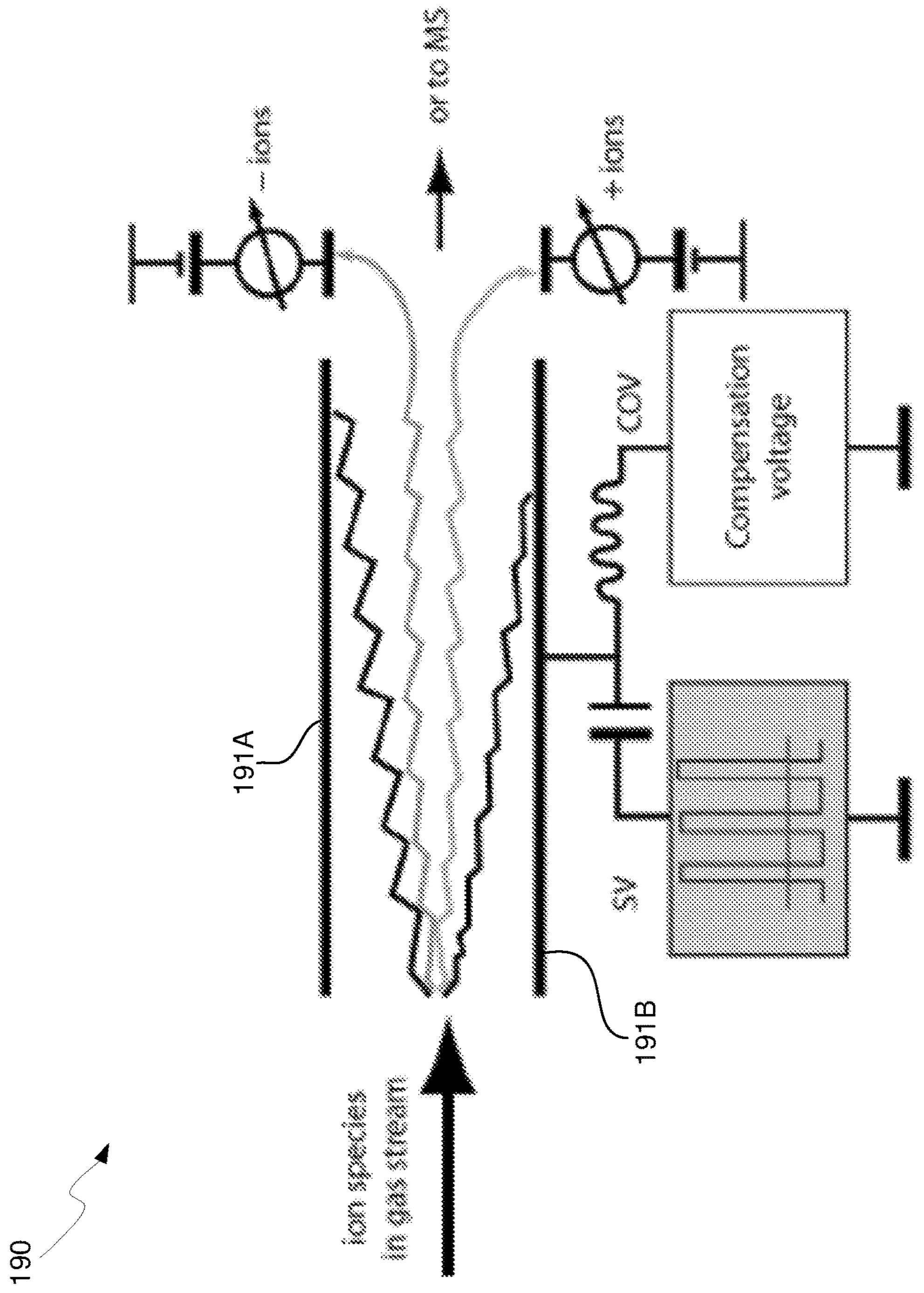
FIG. 1D provides a simplified schematic of an exemplar planar DMS system, in accordance with an example embodiment of the disclosure.
Figure 2:
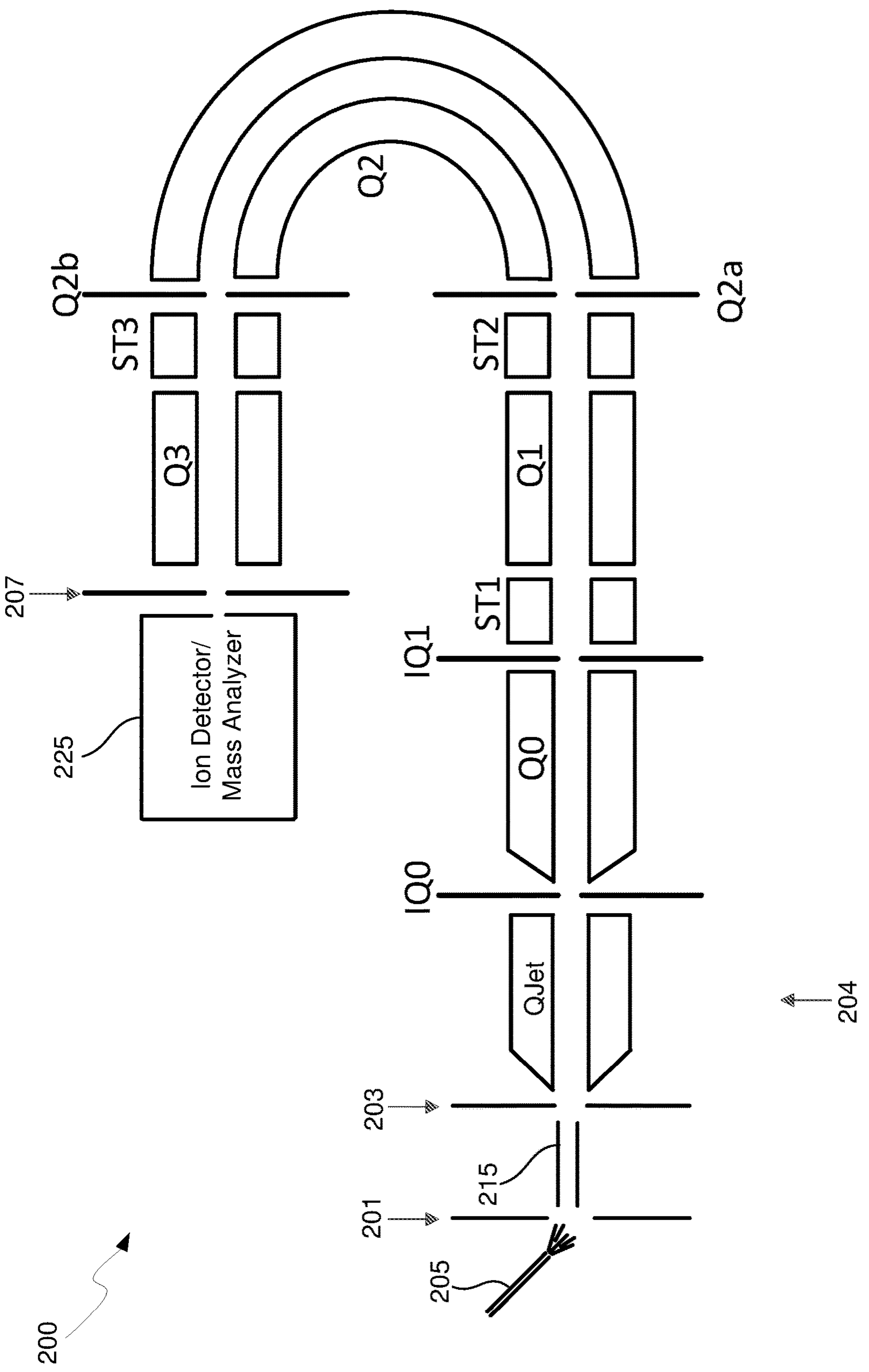
FIG. 2 is a schematic diagram of a mass spectrometer system with a differential mobility separator, in accordance with an example embodiment of the disclosure.

In an example scenario, computing resources 130 may be operable to control a mass spectrometer system, such as the system described with respect to FIGS. 1C-2. Accordingly, the computing resources 130 may be operable to control circuitry for configuring the method parameters in mass spectrometry operations. Optimizing method parameters in differential mobility spectrometry is not trivial in a high throughput mass spectrometer system. The SelexION® and SelexION+® planar DMS devices are examples of DMS systems that provide additional selectivity. Other DMS devices, including curved electrode FAIMS-style DMS devices may also be used for this purpose. In general, the disclosure herein contemplates use of any type of device that offers selectivity based on continuous filtering ion mobility and uses the term DMS to refer to these types of devices.

The difficulty in configuring method parameters is particularly true when trying to analyze a panel of compounds simultaneously. One of the key difficulties is related to method cycle time. A high speed mass spectrometer, such as Sciex's Echo® mass spectrometer system, generates data peaks that are quite narrow, where baseline peak widths may typically be less than 2 s. When using a sampling interface, such as an open port interface used in the Echo® MS System, the final peak widths depend to a large extent upon operational conditions such as transfer tube dimensions, flow rate, sprayer design, sample injection volume, and nebulizer gas flow rate. DMS separations occur at atmospheric pressure and extend the necessary cycle time for analysis of multiple compounds due to the time required to change the DMS parameters between compound selections as well as the settling time for the instrument optics to clear from the previous compound selection and pass the new compound selection (e.g. 10-20 ms pause time typical versus the standard 5 ms pause time). For curved electrode FAIMS devices, pause times can be substantially longer (30-200 ms), further extending method cycle times.

Cycle times for multi-analyte methods, such as multiple reaction monitoring (MRM), includes a pause time as well as a dwell time, where dwell time is the period of the overall method cycle in which data is collected for a particular MRM transition. Ion signals are generally measured as count rates (counts per second). Therefore, it is desirable to maximize the dwell time such that the instrument counts the maximum number of ions for a given signal intensity level. The fundamental limit to count rate stability is count statistics, where the error in the measurement is related to the square root of the number of ions counted. Therefore, signal measurement precision increases with longer dwell times. This maximizing of dwell time is balanced against a desired number of points across a peak, where shorter dwell times enables more data points across a peak, resulting in better accuracy in determining peak shape and intensity.

On many instruments, the pause time may be fixed for all transitions. When the dwell time is also constant, the total cycle time is thus N(pause+dwell), where N is the total number of transitions that are monitored in the workflow. In an example embodiment of the present disclosure, the functionality to automatically configure the dwell time for panels of compounds with variable numbers of analytes is described.

FIG. 1B is a schematic diagram of a sample introduction apparatus, in accordance with an example embodiment of the disclosure. Other methods of introducing sample may be used, and the example of FIG. 1B is not intended to be limiting. In FIG. 1B, the acoustic droplet ejection (ADE) device is shown generally at 11, ejecting droplet 49 toward the continuous flow sampling probe (referred to herein as an open port interface (OPI)) indicated generally at 51 and into the sampling tip 53 thereof.

The acoustic droplet ejection device 11 includes at least one reservoir, with a first reservoir shown at 13 and an optional second reservoir 15. In some embodiments a further plurality of reservoirs may be provided. Each reservoir is configured to house a fluid sample having a fluid surface, e.g., a first fluid sample 14 and a second fluid sample 16 having fluid surfaces respectively indicated at 17 and 19. When more than one reservoir is used, as illustrated in FIG. 1B, the reservoirs are preferably both substantially identical and substantially acoustically indistinguishable, although identical construction is not a requirement. It will be apparent to those of skill in the relevant arts that the reservoirs can be wells from a multiwell plate such as a 96, 384, or 1536 well plate.

The ADE comprises an acoustic ejector 33, which includes acoustic energy generator 35 and focusing element 37 for focusing the acoustic energy generated at a focal point 47 within the fluid sample, near the fluid surface. The acoustic ejector 33 is thus adapted to generate and focus acoustic energy so as to eject a droplet of fluid from each of the fluid surfaces 17 and 19 when acoustically coupled to reservoirs 13 and 15, and thus to fluids 14 and 16, respectively. The acoustic energy generator 35 and the focusing element 37 may function as a single unit controlled by a single controller, or they may be independently controlled, depending on the desired performance of the device.

The acoustic droplet ejector 33 may be in either direct contact or indirect contact with the external surface of each reservoir. With direct contact, in order to acoustically couple the ejector to a reservoir, it is preferred that the direct contact be wholly conformal to ensure efficient acoustic energy transfer. That is, the ejector and the reservoir should have corresponding surfaces adapted for mating contact. Thus, if acoustic coupling is achieved between the ejector and reservoir through the focusing element, it is desirable for the reservoir to have an outside surface that corresponds to the surface profile of the focusing element. Without conformal contact, efficiency and accuracy of acoustic energy transfer may be compromised. In addition, since many focusing element have a curved surface, the direct contact approach may necessitate the use of reservoirs that have a specially formed inverse surface.

Optimally, acoustic coupling is achieved between the ejector and each of the reservoirs through indirect contact, as illustrated in FIG. 1B. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing element 37 and the underside of the reservoir. As shown, the first reservoir 13 is acoustically coupled to the acoustic focusing element 37 such that an acoustic wave generated by the acoustic energy generator is directed by the focusing element 37 into the acoustic coupling medium 41, which then transmits the acoustic energy into the reservoir 13.

In operation, reservoir 13 and optional reservoir 15 of the device are filled with first and second fluid samples 14 and 16, respectively, as shown in FIG. 1B. The acoustic ejector 33 is positioned just below reservoir 13, with acoustic coupling between the ejector and the reservoir provided by acoustic coupling medium 41. Initially, the acoustic ejector is positioned directly below sampling tip 53 of OPI 51, such that the sampling tip faces the surface 17 of the fluid sample 14 in the reservoir 13. Once the ejector 33 and reservoir 13 are in proper alignment below sampling tip 53, the acoustic energy generator 35 is activated to produce acoustic energy that is directed to a point 47 near the fluid surface 17 of the first reservoir. As a result, droplet 49 is ejected from the fluid surface 17 toward and into the liquid boundary 50 at the sampling tip 53 of the OPI 51, where it combines with capture liquid (for example a solvent in some embodiments) in the flow probe 53. The profile of the liquid boundary 50 at the sampling tip 53 may vary from extending beyond the sampling tip 53 to projecting inward into the OPI 51. In a multiple-reservoir system, the reservoir unit (not shown), e.g., a multi-well plate or tube rack, may then be repositioned relative to the acoustic ejector such that another reservoir is brought into alignment with the ejector and a droplet of the next fluid sample may be ejected. The capture liquid in the flow probe cycles through the probe continuously, minimizing or even eliminating “carryover” between droplet ejection events. Fluid samples 14 and 16 are samples of any fluid for which transfer to an analytical instrument is desired, where the term “fluid” is as defined earlier herein.

The structure of OPI 51 is also shown in FIG. 1B. Any number of commercially available continuous flow sampling probes may be used as is or in modified form, all of which, as is well known in the art, operate according to substantially the same principles. As can be seen in the FIG. 1B, the sampling tip 53 of OPI 51 is spaced apart from the fluid surface 17 in the reservoir 13, with a gap 55 there between. The gap 55 may be an air gap, or a gap of an inert gas, or it may comprise some other gaseous material; there is no liquid bridge connecting the sampling tip 53 to the fluid 14 in the reservoir 13. The OPI 51 includes a capture liquid inlet 57 for receiving capture liquid from a capture liquid source and a capture liquid transport capillary 59 for transporting the capture liquid flow from the capture liquid inlet 57 to the sampling tip 53, where the ejected droplet 49 of analyte-containing fluid sample 14 combines with the capture liquid. In embodiments where the capture liquid comprises a solvent, the analyte-containing fluid sample 14 combines with the solvent to form an analyte-solvent dilution. A capture liquid pump (not shown) is operably connected to and in fluid communication with capture liquid inlet 57 in order to control the rate of capture liquid flow into the capture liquid transport capillary and thus the rate of capture liquid flow within the capture liquid transport capillary 59 as well.

Fluid flow within the OPI 51 carries the analyte-solvent dilution through a sample transport capillary 61 provided by inner capillary tube 73 toward sample outlet 63 for subsequent transfer to an analytical instrument. In a preferred embodiment, a positive displacement pump is used as the capture liquid pump, e.g., a peristaltic pump, and, instead of a sampling pump, an aspirating nebulization system may be used so that the analyte-solvent dilution, or capture liquid and analyte-containing fluid sample mixture as the case may be, is drawn out of the sample outlet 63 by the Venturi effect caused by the flow of the nebulizing gas introduced from a nebulizing gas source 65 via gas inlet 67 (shown in simplified form in FIG. 1B, insofar as the features of aspirating nebulizers are well known in the art) as it flows over the outside of the sample outlet 63.

The analyte-solvent dilution flow is then drawn upward through the sample transport capillary 61 by the pressure drop generated as the nebulizing gas passes over the sample outlet 63 and combines with the fluid exiting the sample transport capillary 61. A gas pressure regulator may be used to control the rate of gas flow into the system via gas inlet 67. In an example manner, the nebulizing gas flows over the outside of the sample transport capillary 61 at or near the sample outlet 63. The nebulizing gas tube truncates behind the sample outlet tip of tube 61, and the gas draws the analyte-solvent dilution through the sample transport capillary 61 as it flows across the sample outlet 63.

The capture liquid transport capillary 59 is provided by outer capillary tube 71 and inner capillary tube 73 substantially co-axially disposed therein, where the inner capillary tube 73 defines the sample transport capillary, and the annular space between the inner capillary tube 73 and outer capillary tube 71 defines the capture liquid transport capillary 59.

The system may also comprise an adjuster 75 coupled to the outer capillary tube 71 and the inner capillary tube 73. The adjuster 75 may be adapted for moving the outer capillary tube tip 77 and the inner capillary tube tip 79 longitudinally relative to one another. The adjuster 75 may be any device capable of moving the outer capillary tube 71 relative to the inner capillary tube 73. Exemplary adjusters 75 may comprise motors including, but are not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the probe 51, and the inner and outer capillary tubes 73, 71 may be arranged coaxially around a longitudinal axis of the probe 51, as shown in FIG. 1B. Additionally, as illustrated in FIG. 1B, the OPI 51 may be generally affixed within an approximately cylindrical holder 81, for stability and ease of handling.

It should be noted that the ADE described above is just an example and other forms of ejectors, including pneumatic, piezoelectric, hydraulic, and mechanical, for example, as well as other forms of sample introduction such as dripping, injecting, etc., could be used to introduce samples to the OPI 51.

FIG. 1C schematically depicts an embodiment of a droplet ejection (ADE) and ionization system 110, in accordance with an example embodiment of the disclosure. The system 110 may be suitable for ionizing and mass analyzing analytes received within an open end of a sampling probe 51, the system 110 including an acoustic droplet ejection device 11 configured to inject a droplet 49, from a reservoir into the open end of the sampling probe 51. As shown in FIG. 1C, the system 110 generally includes a sampling probe 51 (e.g., an open port probe) in fluid communication with a nebulizer-assisted ion source 160 for discharging a liquid containing one or more sample analytes (e.g., via electrospray electrode 164) into an ionization chamber 112, and a mass analyzer 170 in fluid communication with the ionization chamber 112 for downstream processing and/or detection of ions generated by the ion source 160. A fluid handling system 140 (e.g., including one or more pumps 143 and one or more conduits) may provide for the flow of liquid from a capture liquid reservoir 150 to the sampling probe 51 and from the sampling probe 51 to the ion source 160.

The capture liquid reservoir 150 (e.g., containing a liquid, such as a desorption solvent) may be fluidly coupled to the sampling probe 51 via a supply conduit through which the liquid may be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. The flow of liquid into and out of the sampling probe 51 occurs within a sample space accessible at the open end such that one or more droplets can be introduced into the liquid boundary 50 and subsequently delivered to the ion source 160.

As shown, the system 110 includes an acoustic droplet ejection device 11 that is configured to generate acoustic energy that is applied to a liquid contained with a reservoir (as depicted in FIG. 1B) that causes one or more droplets 49 to be ejected from the reservoir into the open end of the sampling probe 51. A controller 180 may be operatively coupled to the acoustic droplet ejection device 11 and configured to operate any aspect of the acoustic droplet ejection device 11 (e.g., focusing, acoustic energy generator, automatically positioning one or more reservoirs into alignment with the acoustic energy generator, etc.) so as to inject droplets into the sampling probe 51 or otherwise discussed herein substantially continuously or for selected portions of an experimental protocol by way of non-limiting example.

As shown in FIG. 1C, the exemplary ion source 160 may include a source 65 of pressurized gas (e.g. nitrogen, air, or a noble gas) that supplies a high velocity nebulizing gas flow which surrounds the outlet end of the electrospray electrode 164 and interacts with the fluid discharged therefrom to enhance the formation of the diluted sample plume and the ion release within the plume for sampling by curtain plate aperture 114*b* and inlet orifice aperture 116*b*.

The nebulizer gas may be supplied at a variety of flow rates, for example, in a range from about 0.1 L/min to about 20 L/min, which may also be controlled under the influence of controller 180 (e.g., via opening and/or closing one or more valves 163). In accordance with various aspects of the present teachings, it will be appreciated that the flow rate of the nebulizer gas may be adjusted (e.g., under the influence of controller 180) such that the flow rate of liquid within the sampling probe 51 may be adjusted based, for example, on suction/aspiration force generated by the interaction of the nebulizer gas and the analyte-solvent dilution as it is being discharged from the electrospray electrode 164 (e.g., due to the Venturi effect).

In the depicted embodiment, the ionization chamber 112 may be maintained at an atmospheric pressure, though in some embodiments, the ionization chamber 112 may be maintained at higher or lower pressures. The ionization chamber 112, within which the analyte may be ionized as the analyte-solvent dilution is discharged from the electrospray electrode 164, is separated from a gas curtain chamber 114 by a curtain plate 114*a* having a curtain plate aperture 114*b*. As shown, a vacuum chamber 116, which houses the mass analyzer 170, is separated from the curtain chamber 114 by a plate 116*a* having a vacuum chamber sampling orifice 116*b*. The vacuum chamber 116 may be maintained at a selected pressure(s) (e.g., the same or different sub-atmospheric pressures, a pressure lower than the ionization chamber) by evacuation through one or more vacuum pump ports 118 and the curtain chamber 114 may be configured at a certain pressure using a curtain gas via inlet 119. While the electrospray electrode 164 is shown being parallel to the inlet, other angles are possible, such as at an oblique angle or perpendicular to the sample inlet at curtain plate aperture 114*b*.

It will also be appreciated by a person skilled in the art and in light of the teachings herein that the mass analyzer 170 may have a variety of configurations. Generally, the mass analyzer 170 is configured to process (e.g., filter, sort, dissociate, detect, etc.) sample ions generated by the ion source 160. By way of non-limiting example, the mass analyzer 170 may be a triple quadrupole mass spectrometer, a hybrid quadrupole time of flight mass spectrometer, or any other mass analyzer known in the art and modified in accordance with the teachings herein. Other non-limiting, exemplary mass spectrometer systems that may be modified in accordance with various aspects of the systems, devices, and methods disclosed herein may be found, for example, in an article entitled "Product ion scanning using a Q-q-Qlinear ion trap (Q TRAP®) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties.

Other configurations, including but not limited to those described herein and others known to those skilled in the art, may also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements may be included in the system 110 including, for example, an ion mobility spectrometer (e.g., a differential mobility spectrometer) that is disposed between the ionization chamber 112 and the mass analyzer 170 and is configured to separate ions based on their mobility through a drift gas in high- and low-fields rather than their mass-to-charge ratio). Additionally, it will be appreciated that the mass analyzer 170 may comprise a detector that can detect the ions which pass through the analyzer 170 and may, for example, supply a signal indicative of the number of ions per second that are detected. Furthermore, the dwell time, in which the ion counts are made, may be configured to result in a desired coefficient of variation in the output signal. The mass analyzer 170 may also include additional differentially pumped vacuum stages, and other ion optics devices such as ion guides or lenses.

FIG. 1D provides a simplified schematic of an exemplar planar DMS system, in accordance with an example embodiment of the disclosure. Referring to FIG. 1D, there is shown DMS cell 190 comprising two flat, parallel plate electrodes 191A and 191B with an asymmetric separation voltage (SV) applied between them. The SV may be generated, for instance, by applying a first sine wave on one of the electrodes and a second sine wave with double the frequency and half the amplitude on the other electrode, and controlling the relative phase. Other non-limiting waveforms that can be used to create the SV are described in the following journal publication which is hereby incorporated by reference in its entirety (Krylov et al, "Selection and Generation of Waveforms for Differential Mobility Spectrometry", Rev. Sci Instr., 81, 024101, 2010).

Ions may be transported through the DMS cell 190 by a transport gas flow and drift towards one of the electrodes 191A or 191B during the high field portion of the waveform and the other electrode during the lower field portion of the waveform. This results in a zig-zag trajectory with a net drift towards one or the other electrode 191A or 191B, depending upon the difference between an ion's high and low field mobility. A small DC potential (compensation voltage, CoV) may be applied between the two flat plates to correct the trajectory for a given ion such that the transport gas flow carries the ion into a downstream mass spectrometer (i.e. the DMS cell transmits the selected ion). As operational parameters, SV and CoV are often considered as a specific pair of values, i.e. an SV/CoV pair, for a given separation operation.

FIG. 2 is a schematic diagram of a mass spectrometer system with a differential mobility separator, in accordance with an example embodiment of the disclosure. Referring to FIG. 2, there is shown mass spectrometer 200 comprising quadrupoles Qjet and Q0-Q3, curtain plate 201, orifice plates 203, IQ0/IQ1, Q2*a*/Q2*b*, and 207, stubby rods ST1-ST3, and ion detector/mass analyzer 225. The differential mobility spectrometer 215 may be sealed to the inlet orifice plate 203 so that the gas flow into the first vacuum stage draws the transport gas through the DMS cell.

The quadrupoles QJet and Q0-Q3 may comprise four electrodes/poles that may be biased with DC and/or AC voltages for capturing, confining, and ejecting charged ions. The electrodes may be cylindrical or may have a hyperbolic shape, for example. In addition, Q2 may comprise a curved quadrupole for directing ions in a direction 180 degrees from the incoming stream, for example. The curtain plate 201 and orifice plates 203, IQ0/IQ1, Q2*a*/Q2*b*, and 207 may comprise plates with an orifice formed therein for allowing ions to pass through but with the orifice being small enough to enable a pressure difference between chambers, such as vacuum chamber 204 following DMS 215, for example, and other higher or lower pressure regions of the mass spectrometer 200.

The stubby rods ST1-ST3 may comprise shorter rods, as compared to Qjet and Q0-Q3, that guide ions between quadrupoles, and may also be biased with DC and/or RF fields for transporting ions confined along a central axis. The ion detector/mass analyzer 225 may comprise a microchannel plate (MCP) electron multiplier, an optical detector, an electrostatic trap, or a TOF mass spectrometer, for example, that may be operable to detect the number of charged ions ejected from Q2. The mass analyzer 225 may include an additional quadrupole analyzer (Q3) in the case of a triple quadrupole mass spectrometer system.

During operation of the mass spectrometer 200, ions may be admitted from the DMS 215 into vacuum chamber 204 through orifice plate 203. Ions may be collisionally cooled in Q0, which may be maintained at a low pressure, such as less than 100 mTorr, for example. Quadrupole Q1 may operate as transmission RF/DC quadrupole mass filter. Q2 may comprise a curved quadrupole for directing ions in a direction 180 degrees from the incoming direction. Ions may be trapped radially in any of Q0-Q3 by RF voltages applied to the rods and axially by DC voltages applied to the end aperture lenses or orifice plates. In addition, Q2 may comprise orifice plates Q2*a* and Q2*b* to enable a pressure difference between the higher pressure of Q2 and other regions of mass spectrometer 200.

According to aspects of the present disclosure, an auxiliary RF voltage may be provided to end rod segments, end lenses, and/or orifice plates of one of the rod sets to provide a pseudo potential barrier. In this way, both positive and negative ions may be trapped within a single rod set or cell. In a MRM process, where multiple analytes are to be assessed, a first m/z can be selected in Q1 and accelerated into Q2 to undergo energetic collisions with background gas molecules. The ions can be fragmented to generate daughter ions which can subsequently be mass analyzed in Q3 prior to ion detection.

The present disclosure provides an automated method optimization tool that determines and sets MRM dwell times that are specifically configured to yield data with low variability independent of the total number of MRM transitions or the actual OPP peak width. The system determines the conditions that should be used when analyzing multiple MRM methods simultaneously. This approach may also be used to automatically set the maximum dwell period possible for analysis of a given number of analytes prior to having a detrimental effect on the coefficient of variability. It is also possible to automatically define the optimal dwell time for a multi analyte analysis to achieve a specified % coefficient of variation (CV).

The approach involves injecting a sample with one or more replicates using a mass spectrometer system with DMS (or without) using a predefined initial method. The automated approach involves analyzing the data to determine the average width of the mass spectrometer analysis result (peaks) that are generated. The user enters the desired number of analytes to include in the panel and cycle time may be calculated by the system using the equation below, where N is the desired number of analytes to monitor.

$$\text{Cycle Time}=N(\text{Pause Time}+\text{Dwell Time}) \quad \text{Equation 1}$$

In the present disclosure, the observed CV for replicate injections may be correlated to the number of points measured across a peak of interest. The number of points across a peak may be determined using the following equation:

$$\text{Points Across a Peak}=\text{Peak Width}/\text{Cycle Time} \quad \text{Equation 2}$$

Figure 3:
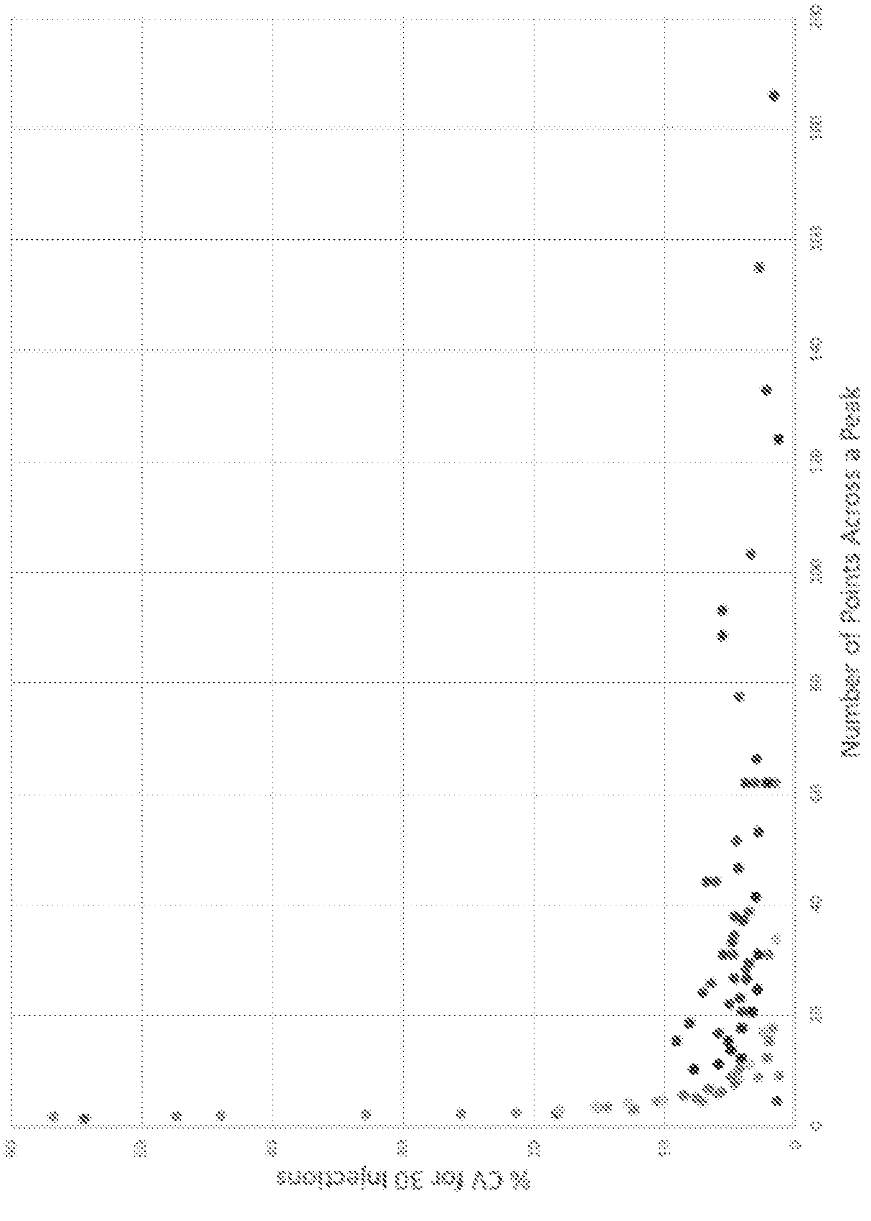
FIG. 3 illustrates a plot of coefficient of variation for peak areas versus the number of points across the peak width, in accordance with an example embodiment of the disclosure.
Figure 4:
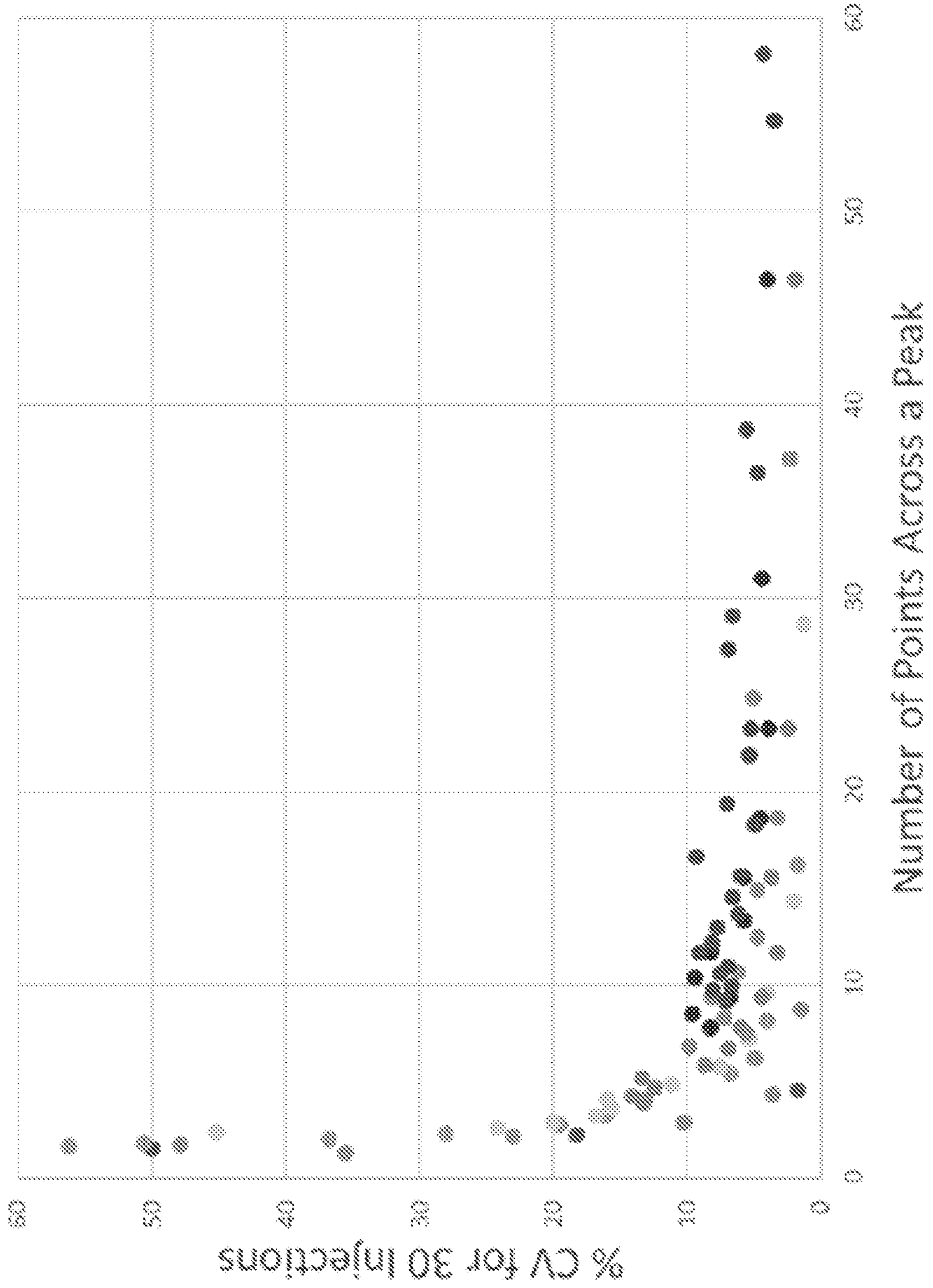
FIG. 4 illustrates a plot of coefficient of variation for peak areas versus the number of points across the peak width with DMS, in accordance with an example embodiment of the disclosure.

The data (taken both with and without DMS) show a clear relationship between % CV for replicate injections vs points measured across a peak, as shown in FIGS. 3 and 4 for data taken without and with a DMS.

FIG. 3 illustrates a plot of coefficient of variation for peak areas versus the number of points across the peak width, in accordance with an example embodiment of the disclosure. The plot shows the % CV for 30 injections versus the number of points across the peak without a DMS. The data show that % CV rises asymptotically when the number of points across a peak decreases below about 5. This may provide guidance as to the minimum required points across a peak to achieve a given % CV. In addition, the % CV is generally flat when there are at least 8 points across the peaks. Given this criteria, it is possible to work backwards, starting with Equation 2 above.

With a measured peak width and a desired number of points across a peak (for instance 8), the cycle time may be calculated. For a fixed pause time and a specific number of analytes to monitor (N), the cycle time may be used in Equation 1 to calculate the maximum recommended dwell time. In this manner, an automated approach may completely eliminate the trial and error approach that is used today, and the automated approach may be set to generate data with a pre-defined or optimal % CV.

FIG. 4 illustrates a plot of coefficient of variation for peak areas versus the number of points across the peak width with DMS, in accordance with an example embodiment of the disclosure. The plot shows the % CV for 30 injections versus the number of points across the peak with a DMS. As with the measurements without DMS, the data show that % CV rises asymptotically when the number of points across a peak decreases below about 5, which may provide guidance as to the minimum required points across a peak to achieve a given % CV with DMS. In addition, as with FIG. 3, the % CV is generally flat when there are at least 8 points across the peaks, beyond which there is little improvement in % CV with more points.

Figure 5:
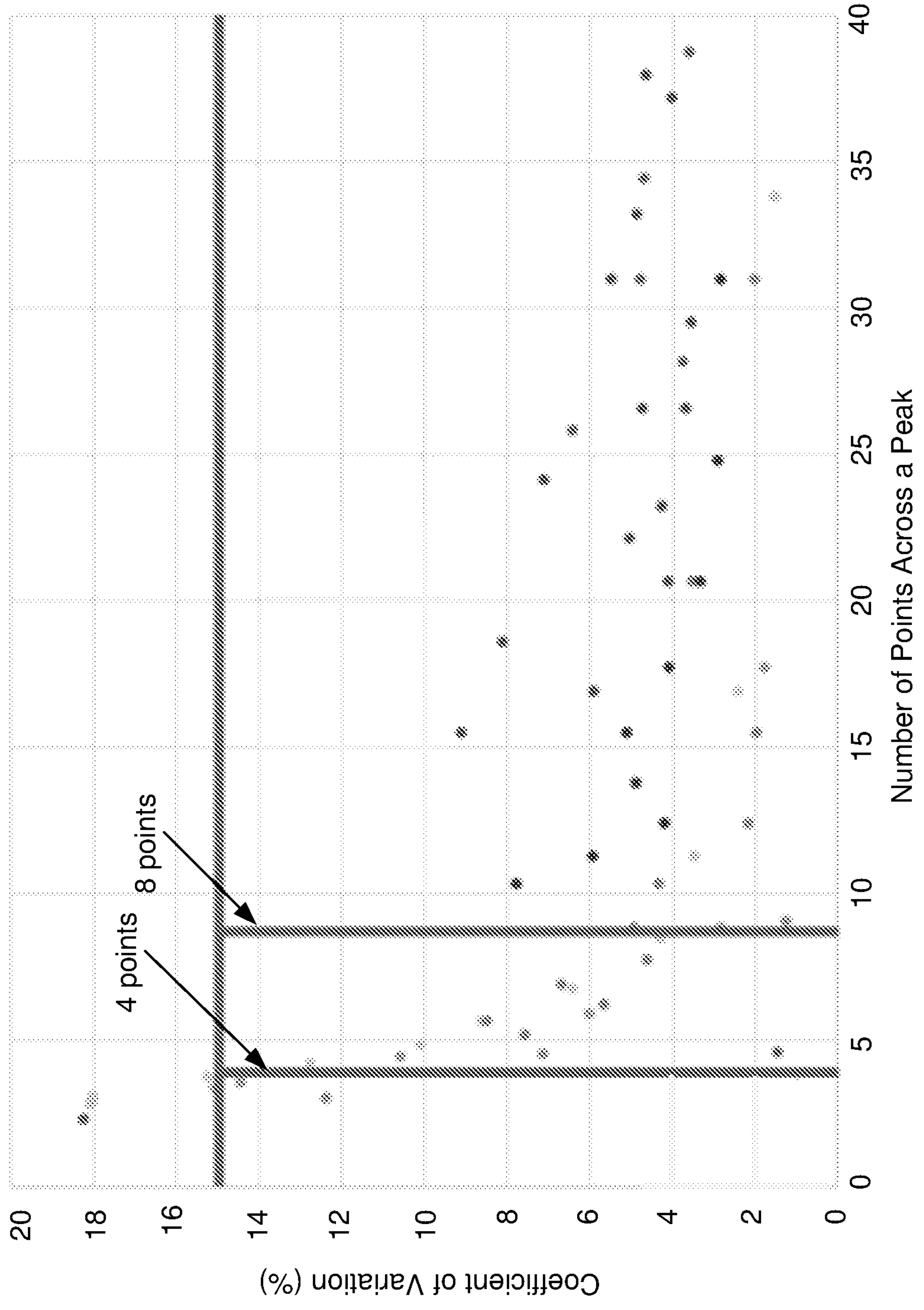
FIG. 5 illustrates a zoomed-in view of the coefficient of variation versus the number of points across a peak without DMS, in accordance with an example embodiment of the disclosure.

FIG. 5 illustrates a zoomed-in view of the coefficient of variation versus the number of points across a peak without DMS, in accordance with an example embodiment of the disclosure. The plot shows data for a series of injections run on an ADE-OPI-MS system without DMS in replicates of 30. With each set of injections, the number of MRM transitions in the method was increased, until there were 12 MRM transitions being run simultaneously. The resulting peaks were analyzed, and the calculated % CVs were plotted as a function of the number of points across the peak. The number of points across the peak were calculated based on the average peak width and Equations 1-2.

The horizontal line is drawn at 15% CV, corresponding to an arbitrary maximum % CV value that might be accepted. From this data, it is clear that at least 4 points across a peak are needed to ensure CVs lower than 15%. However, there is a clear reduction in the % CV trend as the number of points across the peak increases to at least 8. From this point and higher, the measured % CV is relatively flat. These data provide clear guidance regarding the dwell time to be used to simultaneously monitor N compounds.

Figure 6:
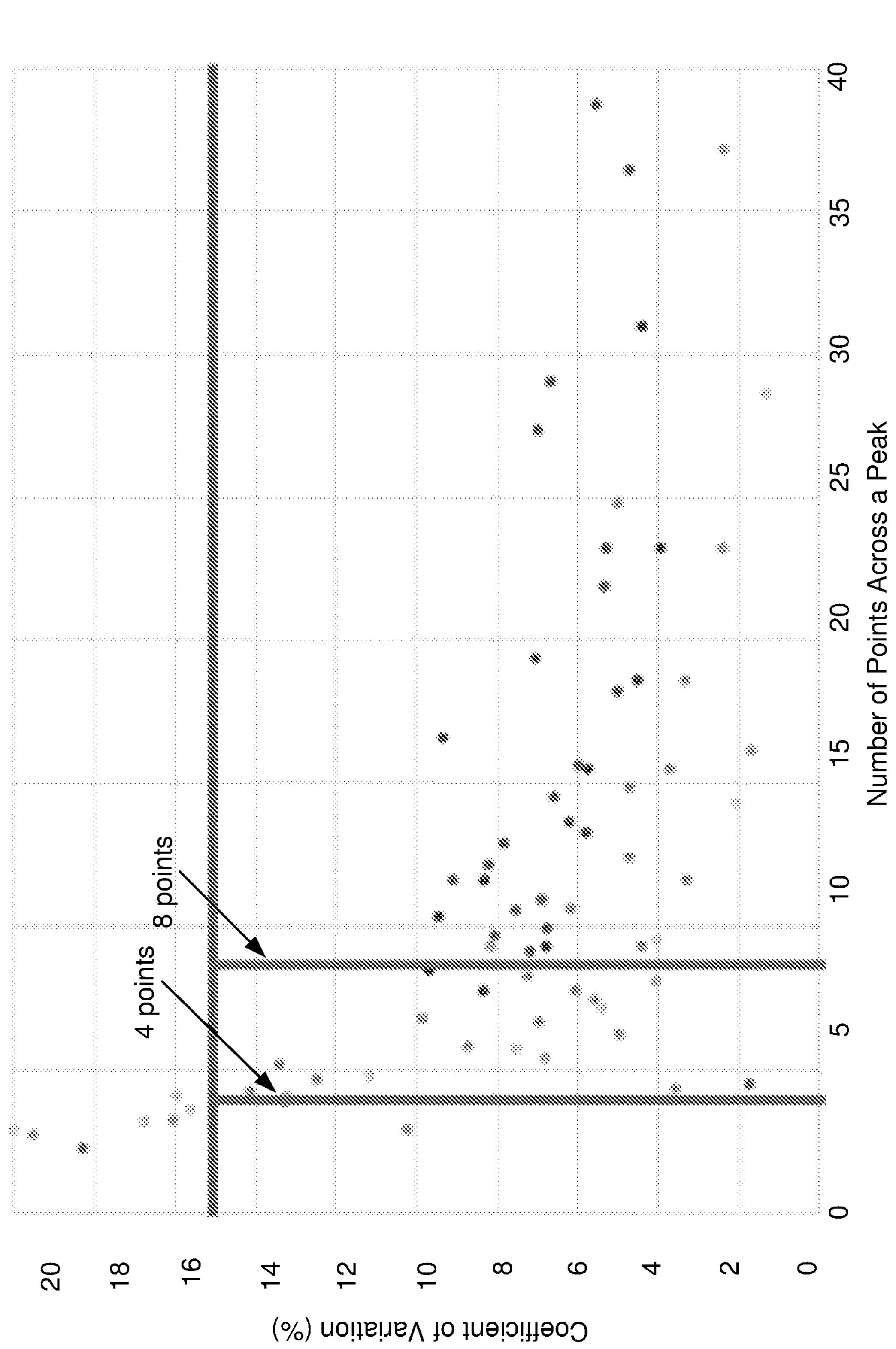
FIG. 6 illustrates a zoomed-in view of the coefficient of variation versus the number of points across a peak with DMS, in accordance with an example embodiment of the disclosure.

FIG. 6 illustrates a zoomed-in view of the coefficient of variation versus the number of points across a peak with DMS, in accordance with an example embodiment of the disclosure. The plot of % CV vs number of points across a peak looks very similar to FIG. 5. Again, it is clear that at least 4 points across a peak generate % CV values lower than 15%, and there is no significant improvement with more than 8 points measured across a peak.

Figure 7A:
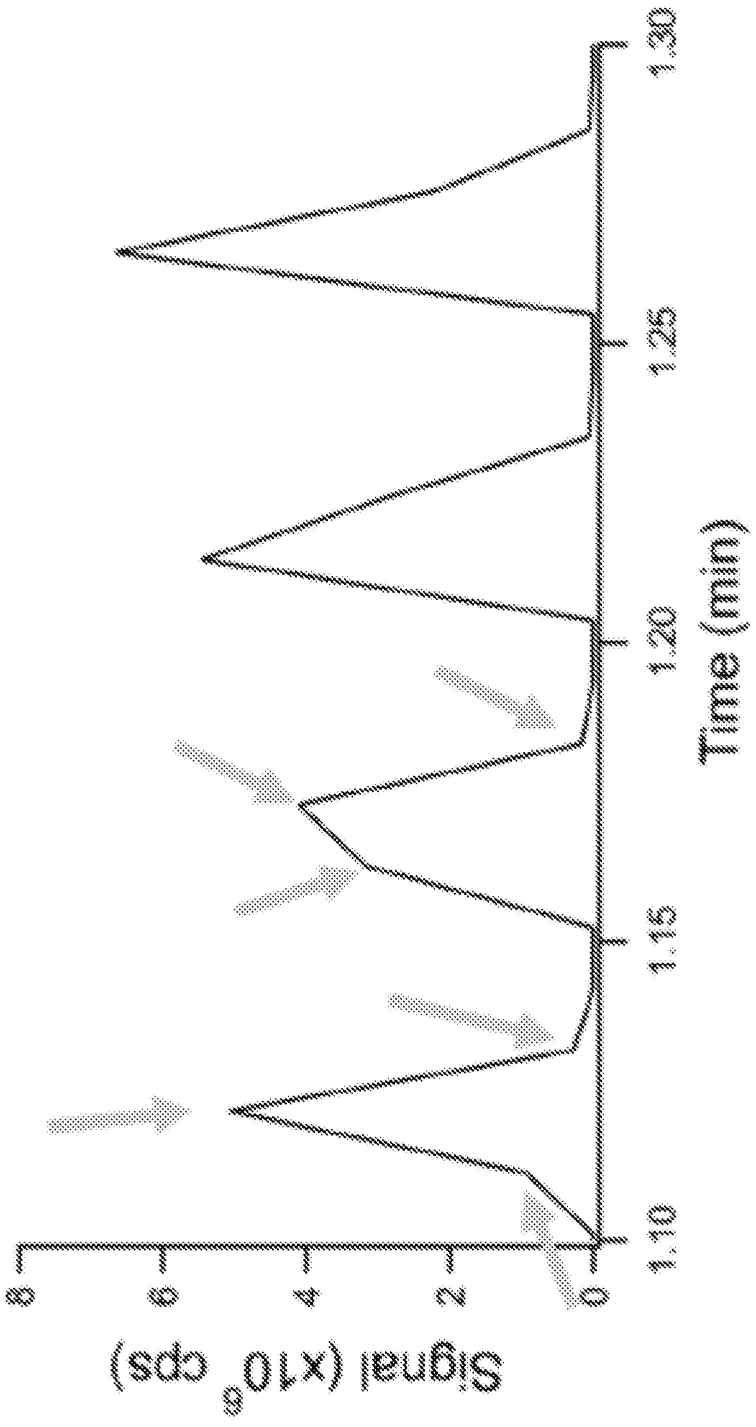
FIGS. 7A-7C illustrate examples of the peak shapes acquired in measurements with on average 3 points, 8 points, and 15 points, respectively.
Figure 7B:
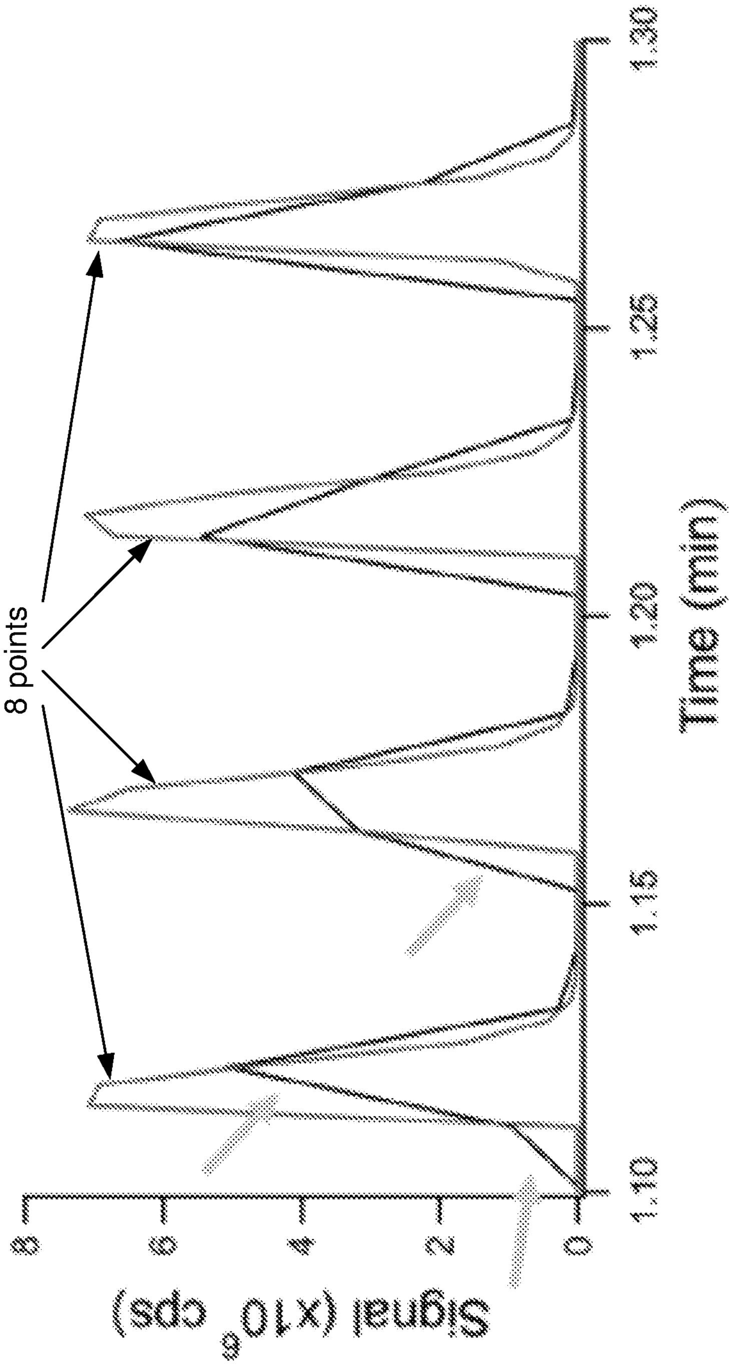
Figure 7C:
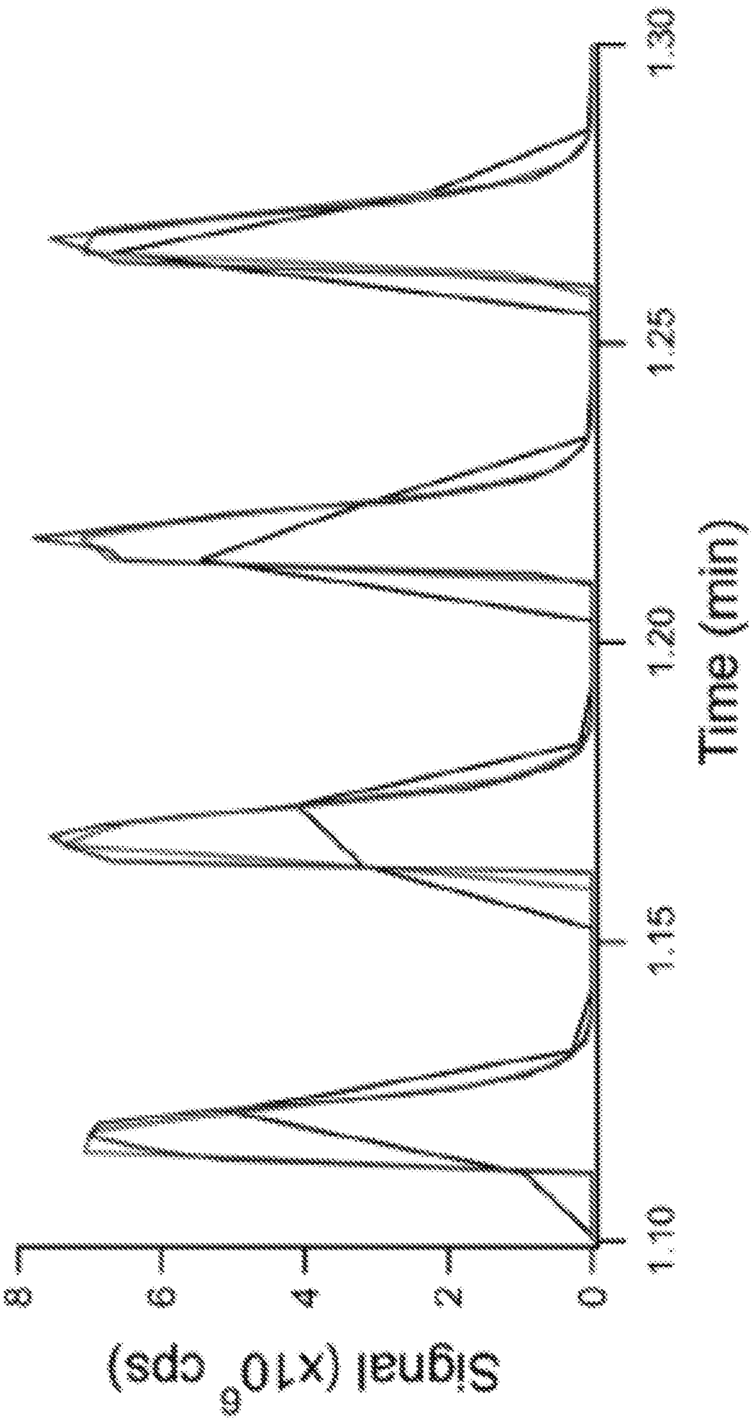

FIGS. 7A-7C illustrate examples of the peak shapes acquired in measurements with on average 3 points, 8 points, and 15 points, respectively. As shown in FIG. 7A, when there are only 3 points taken across a peak, as shown by the arrows on the first two peaks, the peak shape is a very poor representation of the actual data. Peaks are at best triangulated, as shown with the 3rd injection, and at worst, have substantially lower peak height, as shown with the 2nd injection.

Referring to FIG. 7B, the peaks are far better defined when taking 8 data points across the peaks of interest, as indicated by the peaks of consistent height, as compared to the varying heights resulting from three points, which explains the dramatic improvement in % CV. With only three points, the peaks are deformed due to straight lines between points, and the peak height depends on how the data points overlap with the timing of the top of the peak.

FIG. 7C shows data taken with 3, 8, and 15 points taken across the peaks, demonstrating the law of diminishing returns. There is very little improvement in the observed peak shape when adjusting cycle time to have 15 points across the peaks, rather than 8 points.

Using the information from these measurements, the conditions that result in at least 8 points across the peak may be calculated using an example 5 ms pause time associated with running a mass spectrometer system with no DMS installed. The column to the left-hand side of Table 1 indicates the number of MRM transitions in the method, while the dwell times are listed in the second row (Dwell 400=400 ms, Dwell 50=50 ms, etc. . . . ). Each value in the table is calculated by dividing the average peak width by the duty cycle time. The values in row 1 (# of transitions) of Dwell 200, rows 1 and 2 of Dwell 100, rows 1-4 of Dwell 50, rows 1-7 of Dwell 25, and rows 1-12 of Dwell 10, Dwell 5, Dwell 2, and Dwell 1 (to the right in the table) indicate the conditions that result in at least 8 points across the peak when running a mass spectrometer system with no DMS. For example, when running 8 MRM transitions simultaneously, the user would need to use a dwell time of less than 25 ms.

It should be noted that it is not best to just pick the shortest dwell time for any given number of transitions, because as dwell times decrease, the total number of ions counted is reduced, resulting in noisier signals, and indicating the trade-off in configuring the method parameters.

across the peak may be calculated using the 15 ms pause time associated with running a mass spectrometer system with DMS installed. Again, the column to the left-hand side of Table 2 indicates the number of MRM transitions in the method, while the dwell times are listed in the second row. The lighter shaded values in row 1 (# of transitions) of Dwell 200, rows 1 and 2 of Dwell 100, rows 1-3 of Dwell 50, rows 1-5 of Dwell 25, rows 1-9 of Dwell 10, rows 1-11 of Dwell 5, and rows 1-12 of Dwell 2 and Dwell 1 (to the right side of the table) indicate the conditions resulting in at least 8 points across the peak when running a mass spectrometer system with DMS.

TABLE 1

Conditions to have at least 8 points across a peak with 5 ms pause time and no DMS

| | Number of Points Across a Peak | | | | | | | | |
|---|---|---|---|---|---|---|---|---|---|
| # of Transitions | Dwell 400 | Dwell 200 | Dwell 100 | Dwell 50 | Dwell 25 | Dwell 10 | Dwell 5 | Dwell 2 | Dwell 1 |
| 1 | 4.593 | 9.073 | 17.714 | 33.818 | 62.000 | 124.000 | 186.000 | 265.714 | 310.000 |
| 2 | 2.296 | 4.537 | 8.857 | 16.909 | 31.000 | 62.000 | 93.000 | 132.857 | 155.000 |
| 3 | 1.531 | 3.024 | 5.905 | 11.273 | 20.667 | 41.333 | 62.000 | 88.571 | 103.333 |
| 4 | | 2.268 | 4.429 | 8.455 | 15.500 | 31.000 | 46.500 | 66.429 | 77.500 |
| 5 | | 1.815 | 3.543 | 6.764 | 12.400 | 24.800 | 37.200 | 53.143 | 62.000 |
| 6 | | 1.512 | 2.952 | 5.636 | 10.333 | 20.667 | 31.000 | 44.286 | 51.667 |
| 7 | | 1.296 | 2.531 | 4.831 | 8.857 | 17.714 | 26.571 | 37.959 | 44.286 |
| 8 | | 1.134 | 2.214 | 4.227 | 7.750 | 15.500 | 23.250 | 33.214 | 38.750 |
| 9 | | 1.008 | 1.968 | 3.758 | 6.889 | 13.778 | 20.667 | 29.524 | 34.444 |
| 10 | | 0.907 | 1.771 | 3.382 | 6.200 | 12.400 | 18.600 | 26.571 | 31.000 |
| 11 | | 0.825 | 1.610 | 3.074 | 5.636 | 11.273 | 16.909 | 24.156 | 28.182 |
| 12 | | 0.756 | 1.476 | 2.818 | 5.167 | 10.333 | 15.500 | 22.143 | 25.833 |

When the system includes a DMS unit, the pause time for the system is increased, increasing the overall duty cycle of the method. To determine the number of points across the peak to obtain a CV of less than 15%, the same series of injections with increasing MRM transitions may be run with the DMS on. The data shown below in Table 2 were acquired using a 15 ms pause time to account for refilling the ion flow path from the DMS to the first mass analyzer between measuring different samples.

From the table of calculated points with DMS, it is possible to analyze twelve MRM transitions at one time. However, because the DMS increases the duty cycle, a shorter dwell time is used compared to the case of no DMS. For example, twelve transitions may be analyzed with a dwell time as high as 10 ms without the DMS as shown in Table 1, but with the DMS, a dwell time of 2 ms results in the desired number of points across the peak, as shown in Table 2. This information shows the maximum dwell time that may be used to achieve the desired number of points across a peak, providing optimal performance for quantitation.

TABLE 2

Conditions to have at least 8 points across a peak with 15 ms pause time and with DMS

| | Number of Points Across a Peak | | | | | | | | |
|---|---|---|---|---|---|---|---|---|---|
| # of Transitions | Dwell 400 | Dwell 200 | Dwell 100 | Dwell 50 | Dwell 25 | Dwell 10 | Dwell 5 | Dwell 2 | Dwell 1 |
| 1 | 4.482 | 8.651 | 16.174 | 28.615 | 46.500 | 74.400 | 93.000 | 109.412 | 116.250 |
| 2 | 2.241 | 4.326 | 8.087 | 14.308 | 23.250 | 37.200 | 46.500 | 54.706 | 58.125 |
| 3 | 1.494 | 2.884 | 5.391 | 9.538 | 15.500 | 24.800 | 31.000 | 36.471 | 38.750 |
| 4 | 1.120 | 2.163 | 4.043 | 7.154 | 11.625 | 18.600 | 23.250 | 27.353 | 29.063 |
| 5 | | 1.730 | 3.235 | 5.723 | 9.300 | 14.880 | 18.600 | 21.882 | 23.250 |
| 6 | | 1.442 | 2.696 | 4.769 | 7.750 | 12.400 | 15.500 | 18.235 | 19.375 |
| 7 | | 1.236 | 2.311 | 4.088 | 6.643 | 10.629 | 13.286 | 15.630 | 16.607 |
| 8 | | 1.081 | 2.022 | 3.577 | 5.813 | 9.300 | 11.625 | 13.676 | 14.531 |
| 9 | | 0.961 | 1.797 | 3.179 | 5.167 | 8.267 | 10.333 | 12.157 | 12.917 |
| 10 | | 0.865 | 1.617 | 2.862 | 4.650 | 7.440 | 9.300 | 10.941 | 11.625 |
| 11 | | 0.786 | 1.470 | 2.601 | 4.227 | 6.764 | 8.455 | 9.947 | 10.568 |
| 12 | | 0.721 | 1.348 | 2.385 | 3.875 | 6.200 | 7.750 | 9.118 | 9.688 |

Similar to the data obtained with no DMS, the DMS injections with at least 8 points across the peak give the lowest % CV. The conditions that result in at least 8 points For the data described above, the methods were run more than 90 times for each table with 30 replicates for each measurement. Using trial and error by the user to obtain this result would be very time-consuming, greatly increasing the amount of run time needed for quantitation, while diminishing performance. Thus, the method of optimizing the method parameters described here to ensure there are enough points across the peak for quantitation greatly improves system throughput and accuracy.

In addition, this automated method parameter configuration ensures that an automated tool removes the trial and error behind optimizing MRM methods when analyzing multiple MRM transitions simultaneously. It optimizes the method parameters to allow for quantitation of samples with optimal % CV and greatly simplifies the process allowing users to run multiple MRM methods simultaneously with better count statistics.

Figure 8:
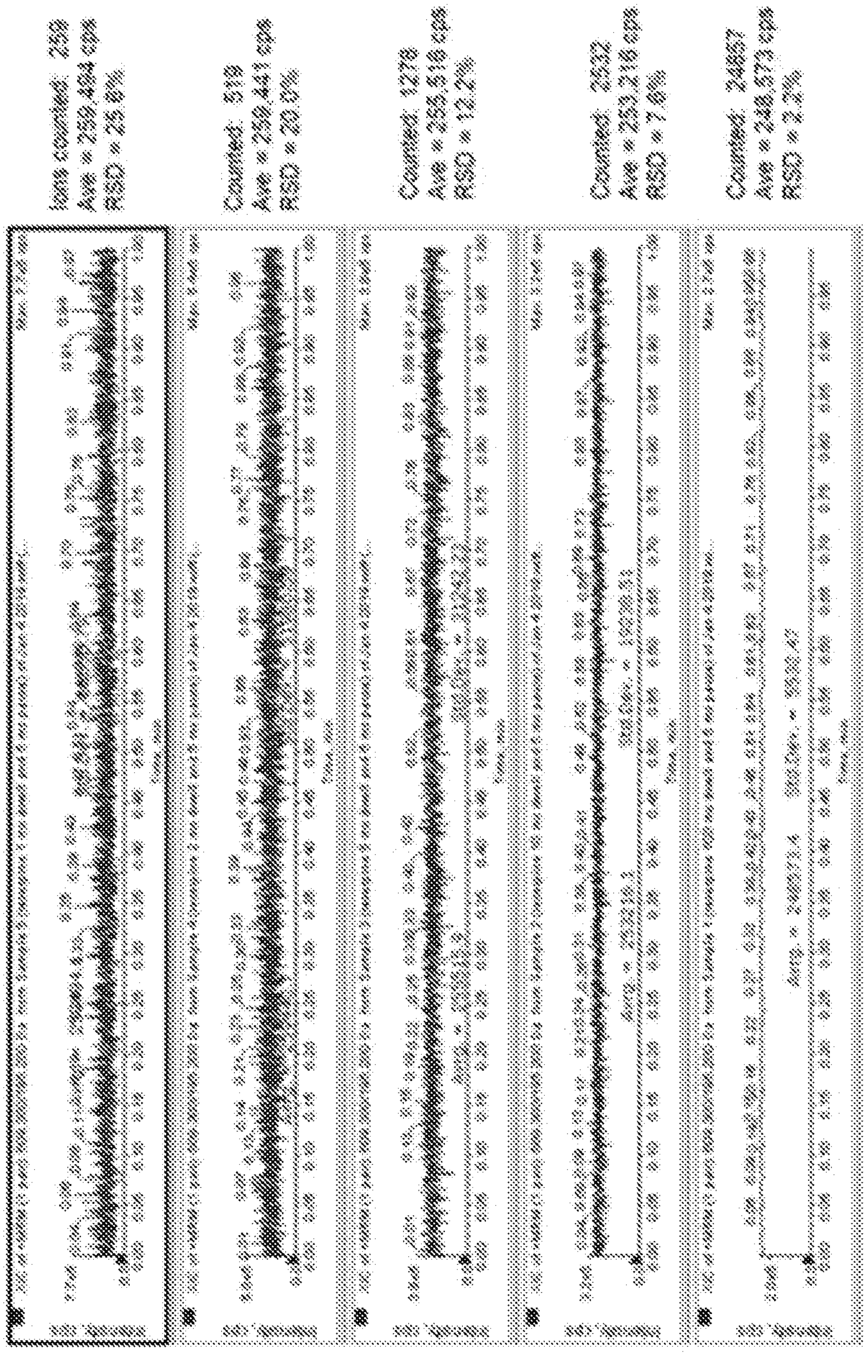
FIG. 8 illustrates ion count measurements for various dwell times, in accordance with an example embodiment of the disclosure.

FIG. 8 illustrates ion count measurements for various dwell times, in accordance with an example embodiment of the disclosure. Referring to FIG. 8, there is shown five plots of ion count versus time for increasing dwell time, with 1 ms, 2 ms, 5 ms, 10 ms, and 100 ms from the top plot to the bottom plot, for the same sample. As indicated by the top plot, with 1 ms dwell time, excessive noise is evident, as quantified by the relative standard deviation (RSD) of 25.6% and only 259 ions counted, compared to the bottom plot with 100 ms dwell time and reduced noise evident by the cleaner plot line, and quantified by the 2.2% RSD and 24,857 ions counted. This illustrates the benefit of using the longest possible dwell time. Accordingly, a dwell time may be chosen as far to the left while still being in the lighter shaded numbers in Tables 1 and 2 above. It is important to note that a dwell time may also be selected that is intermediate to the numbers displayed in the table (i.e. not one of the dwell times in the vertical column).

Figure 9:
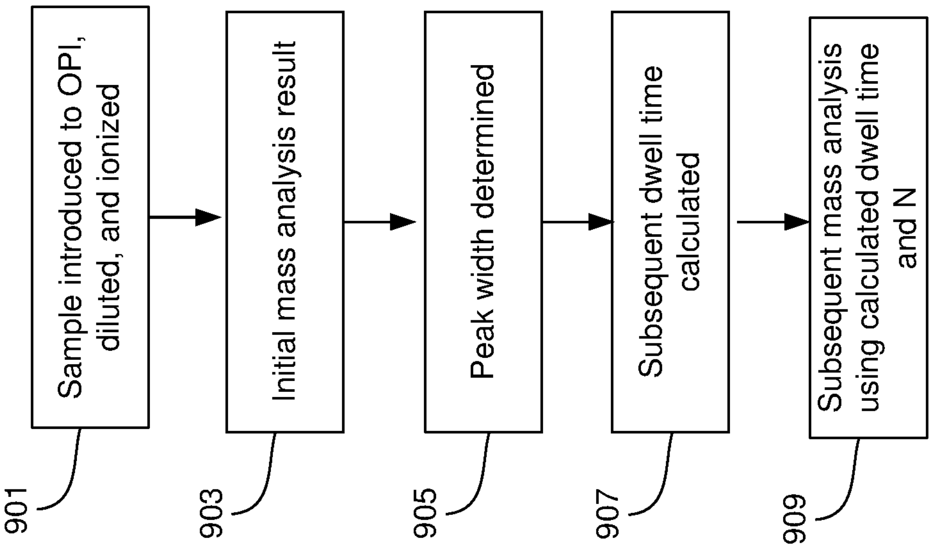
FIG. 9 illustrates a flow chart for method parameter configuration in a mass spectrometer system, in accordance with an example embodiment of the disclosure.

FIG. 9 illustrates a flow chart for method parameter configuration in a mass spectrometer system, in accordance with an example embodiment of the disclosure. Referring to FIG. 9, the process starts in step 901 where a sample is introduced to an OPI from an ADE, for example, although other sample introduction techniques are possible. The sample may be diluted in the OPI and introduced to an ionizer for ionization before being introduced to a mass spectrometer.

In step 903, an initial mass analysis result, such as an ion count versus time from a detector in the mass spectrometer may be obtained using pre-defined dwell time and pause time. In step 905, the peak width may be determined from the mass analysis result This may be important because the peak width using an OPI device can vary depending upon device settings, including nebulizer gas flow rate and acoustic ejection volume. In step 907, a dwell time may be calculated based on the determined peak width, corresponding to a pre-defined number of data points across subsequent mass analysis peak widths, for example greater than 5 points, or greater than 8 points, and a number of transitions to different analytes in the sample. In step 909, subsequent mass analysis measurements may be made using the calculated dwell time to result in the desired or preconfigured number of points across the subsequent peaks and where the dwell time is long enough to result in the lowest RSD while still having the desired number of points.

In an example scenario of the above-described process, in step 901, a sample containing multiple drugs of abuse may be diluted and ionized using an acoustic OPI device installed on a 6500+ triple quadrupole mass spectrometer with a SelexION+ DMS system. In step 903, MRM data may be acquired for 1 or more compounds and the average peak width determined to be 1860 ms. Subsequently, the user may specify the number of analytes to be analyzed in a pending measurement, 6 in this case, with a desire for at least 8 points across a peak. The dwell time may be configured using the following equation:

$$\text{Dwell time}=\text{Peak Width}/(\text{Pts}*N)-\text{pause time} \qquad \text{Equation 3}$$

where Peak Width is the determined peak width, Pts is the pre-defined points across the peak width, N is the number of different analytes to be assessed, and the pause time plus the dwell time equals a cycle time of the mass spectrometer. From this equation, the dwell time may be calculated to be [1860/((8)(6))]−15=23.8 ms. In some aspects, the calculated optimal dwell time can be rounded down to the nearest integer value (i.e. 23 ms in this case).

A system and/or method implemented in accordance with various aspects of the present disclosure, for example, provides automated method parameter configuration for differential mobility separations. As non-limiting examples, various aspects of this disclosure provide receiving a sample in an open port interface; transferring the received sample to an ionization source; ionizing the transferred sample; introducing the ionized sample into a mass spectrometer; mass analyzing the ionized sample to produce an initial mass analysis result; determining a peak width of the initial mass analysis result; and determining a dwell time for subsequent measurements based on the determined peak width, a pre-defined number of data points across subsequent mass analysis peak widths, and a number N of analytes to be assessed for the sample. The sample may be diluted and transferred to the ionization source by a sample introduction apparatus selected from a group including an acoustic droplet ejector (ADE), a pneumatic ejector, a piezoelectric ejector, and a hydraulic ejector. The mass analysis may comprise an MS scan or measurement, and/or an MS/MS scan or measurement including selected ion monitoring and multiple reaction monitoring.

The pre-defined number of points may be 5 or more or 8 or more. The dwell time may be configured at a longest time that results in a coefficient of variation of less than 15%, less than 10%, or less than 5% in the subsequent ion quantity measurements. The dwell time may be configured using equation 3: dwell time=[determined peak width/(pre-defined points across the peak width*N)]−a pause time, wherein the pause time plus the dwell time equals a cycle time of the mass spectrometer. The received analyte may be diluted with solvent in the sample introduction apparatus. The number of different analytes may be received as an input from a user of the mass spectrometer. The analytes may be fragmented in Q2 of a triple quadrupole and a specific daughter ion may be measured in Q3. The transitions to different analytes may be made through one or more fragmentation steps or by mass selection of one or more different analytes. A subset of ions may be selected from the sample to introduce to the mass spectrometer using differential mobility spectrometry and using the determined dwell time. The mass analysis result may comprise an ion count detection versus time. One or more quantities of ions in the sample may be determined using the subsequent measurements.

While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope.

Therefore, it is intended that the disclosure not be limited to the particular example(s) disclosed, but that the disclosure will include all examples falling within the scope of the appended claims.

The invention claimed is:

1. A method for mass spectrometry, the method comprising:
   - receiving a sample in an open port interface;
   - transferring the sample to an ionization source;
   - ionizing the transferred sample;
   - introducing the ionized sample into a mass spectrometer;
   - mass analyzing the ionized sample to produce an initial mass analysis result;
   - determining a peak width of the initial mass analysis result; and
   - determining a dwell time for subsequent measurements based on the determined peak width, a pre-defined number of data points across subsequent mass analysis peak widths, and a number N of different analytes to be assessed for the sample.

2. The method according to claim 1, wherein the sample is diluted and transferred to the ionization source by a sample introduction apparatus selected from a group including an acoustic droplet ejector (ADE), a pneumatic ejector, a piezoelectric ejector, and a hydraulic ejector.

3. The method according to claim 1, wherein the mass analysis comprises an MS/MS scan or measurement including selected ion monitoring or multiple reaction monitoring.

4. The method according to claim 1, wherein the pre-defined number of points is 5 or more.

5. The method according to claim 1, wherein the pre-defined number of points is 8 or more.

6. The method according to claim 1, comprising configuring the dwell time at a longest time that results in a coefficient of variation of less than 15% in the subsequent ion quantity measurements.

7. The method according to claim 1, comprising configuring the dwell time using the relation: dwell time=[determined peak width/(pre-defined points across the peak width*N)]−a pause time, wherein the pause time plus the dwell time equals a cycle time of the mass spectrometer.

8. The method according to claim 1, comprising diluting the received analyte with a capture liquid in the sample introduction apparatus.

9. The method according to claim 1, comprising receiving the number of different analytes as an input from a user of the mass spectrometer.

10. The method according to claim 1, wherein transitions to different analytes are made by mass selection of one or more different analytes.

11. The method according to claim 1, comprising selecting a subset of ions from the sample to introduce to the mass spectrometer using differential mobility spectrometry and the determined dwell time.

12. A mass spectrometer system comprising:
   - a mass spectrometer, an open port interface, an ionization source, a sample introduction apparatus, and a processor, the mass spectrometer system being operable to:
   - receive a sample in the open port interface;
   - transfer the received sample to the ionization source using the sample introduction apparatus;
   - ionize the transferred sample using the ionization source;
   - introduce the ionized sample into the mass spectrometer;
   - mass analyze the ionized sample to produce an initial mass analysis result;
   - determine a peak width of the initial mass analysis result using the processor; and
   - determine, using the processor, a dwell time for subsequent measurements based on the determined peak width, a pre-defined number of data points across subsequent mass analysis peak widths, and a number N of different analytes to be assessed for the sample.

13. The mass spectrometer system according to claim 12, wherein the sample is diluted and transferred to the ionization source by a sample introduction apparatus selected from a group including an acoustic droplet ejector (ADE), a pneumatic ejector, a piezoelectric ejector, and a hydraulic ejector.

14. The mass spectrometer system according to claim 12, wherein the mass analysis comprises an MS/MS scan or measurement including selected ion monitoring and multiple reaction monitoring.

15. The mass spectrometer system according to claim 12, wherein the pre-defined number of points is 5 or more.

16. The mass spectrometer system according to claim 12, wherein the pre-defined number of points is 8 or more.

17. The mass spectrometer system according to claim 12, wherein the mass spectrometer system is operable to configure the dwell time at a longest time that results in a coefficient of variation of less than 15% in the subsequent ion quantity measurements.

18. The mass spectrometer system according to claim 12, wherein the mass spectrometer system is operable to configure the dwell time using the relation: dwell time=[determined peak width/(pre-defined points across the peak width*N)]−a pause time, wherein the pause time plus the dwell time equals a cycle time of the mass spectrometer.

19. The mass spectrometer system according to claim 12, wherein the mass spectrometer system is operable to dilute the received analyte with a capture liquid in the sample introduction apparatus.

20. The mass spectrometer system according to claim 12, wherein the mass spectrometer system is operable to receive the number of different analytes as an input from a user of the mass spectrometer.

21. The mass spectrometer system according to claim 12, wherein transitions to different analytes are made by mass selection of one or more different analytes.

22. The mass spectrometer system according to claim 12, wherein the mass spectrometer system is operable to select a subset of ions from the sample to introduce to the mass spectrometer using differential mobility spectrometry and the determined dwell time.

* * * * *